United States Patent
Yotsumoto et al.

(10) Patent No.: US 7,258,291 B2
(45) Date of Patent: Aug. 21, 2007

(54) DESTRUCTIVE DEVICE, FOAM GAS COLLECTING DEVICE, AND FOAM GAS SEPARATING AND COLLECTING SYSTEM

(75) Inventors: Mikio Yotsumoto, Ibaraki (JP); Yutaka Matsuda, Takarazuka (JP); Susumu Saitou, Ibaraki (JP); Masayuki Makino, Otsu (JP); Kazuo Kimura, Joyo (JP); Yasuo Sasaki, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 146 days.

(21) Appl. No.: 10/476,327

(22) PCT Filed: Jan. 22, 2003

(86) PCT No.: PCT/JP03/00511

§ 371 (c)(1),
(2), (4) Date: Oct. 27, 2003

(87) PCT Pub. No.: WO03/061929

PCT Pub. Date: Jul. 31, 2003

(65) Prior Publication Data
US 2004/0145071 A1    Jul. 29, 2004

(30) Foreign Application Priority Data

| Jan. 23, 2002 | (JP) | ............................. 2002-014692 |
| Jan. 25, 2002 | (JP) | ............................. 2002-016552 |
| Nov. 19, 2002 | (JP) | ............................. 2002-334827 |

(51) Int. Cl.
B30B 15/30 (2006.01)
B29C 44/34 (2006.01)
B09B 3/00 (2006.01)

(52) U.S. Cl. ..................... 241/101.4; 241/3; 241/31; 100/155 R; 264/102; 264/916

(58) Field of Classification Search ............. 241/24.18, 241/31, 102, 916, 3, 101.4; 264/102, 916; 100/155 R
See application file for complete search history.

(56) References Cited

U.S. PATENT DOCUMENTS 5,251,824 A * 10/1993 Adelmann ..................... 241/3
5,651,730 A * 7/1997 McGinnis et al. ............ 452/74

(Continued)

FOREIGN PATENT DOCUMENTS

JP        51-22775        2/1976

(Continued)

*Primary Examiner*—Derris H. Banks
*Assistant Examiner*—Jason Y. Pahng
(74) *Attorney, Agent, or Firm*—Hamre, Schumann, Mueller & Larson, P.C.

(57) ABSTRACT

A destructive device, wherein treated material (1) including a foam body is pre-compressed in thickness direction and fed to the opposed part of a pair of compression rolls (21, 22), partition walls forming independent air bubbles in the foam body is destructed by the compression rolls (21, 22) and foam gas is arrested into a cover (3) installed on the outlet side of the compression rolls (21, 22), the foam gas is liquefied and separated by a cooling and liquefying device (6) through a cooling device (15) after pressurized, together with medium gas (41) for collection, by a pressurizing device (5), and the medium gas for collection from which the foam gas is separated is returned into the cover (3), whereby, since the foam gas is liquefied and separated in pressurized state by the cooling and liquefying device (6) by arresting the foam gas in high density inside the cover (3), the device can be remarkably downsized and simplified, and a device cost and an operation cost can also be remarkably reduced.

8 Claims, 12 Drawing Sheets

U.S. PATENT DOCUMENTS 5,769,333 A * 6/1998 Kimura et al. ............ 241/24.18
6,036,124 A * 3/2000 Takahashi et al. ............ 241/38
6,311,904 B1 * 11/2001 Leturmy et al. .............. 241/18
7,134,387 B2   11/2006 Yotsumoto et al.

FOREIGN PATENT DOCUMENTS

| | | |
|---|---|---|
| JP | 1-139845 | 9/1989 |
| JP | 3-500857 | 2/1991 |
| JP | 6-184348 | 7/1994 |
| JP | 9-87415 | 3/1997 |
| JP | 2679562 | 8/1997 |
| JP | 2002-31458 | 1/2002 |
| WO | 94/03315 | 2/1994 |

* cited by examiner

DESTRUCTIVE DEVICE, FOAM GAS COLLECTING DEVICE, AND FOAM GAS SEPARATING AND COLLECTING SYSTEM

TECHNICAL FIELD

The present invention relates to a destructive device for destroying foam. The present invention also relates to a collecting device and a separating and collecting system for destroying foam and collecting a foaming gas component contained in the foam.

BACKGROUND ART

Foam used in a heat insulator of a heat-insulating housing of a refrigerator or the like is made of a foamed resin such as urethane foam, and chlorofluorocarbons conventionally have been used as a foaming gas therefor. Since chlorofluorocarbons may destroy the ozone layer, it is necessary to collect them and prevent them from diffusing into the air at the time of disposing of the foam.

A conventional method for collecting a foaming gas from foam will be described by way of an exemplary method for disassembling a discarded refrigerator.

First, a refrigerant (for example, chlorofluorocarbons) and a refrigeration oil are collected from the discarded refrigerator, and then a compressor is removed (a pretreatment process). The resultant heat-insulating housing of the refrigerator is put into a peeling and smashing machine (a rough smashing process). The peeling and smashing machine includes a rotating cylindrical body having many rotating and projecting blades on its outer periphery. The peeling and smashing machine roughly smashes the heat-insulating housing of the refrigerator into pieces having a size on the order of several cm and separates the outer wall material (steel plate), the inner wall material (resin plate), the linear object and the heat insulator (urethane foam). At this time, some of the closed-cells in the heat insulator are destroyed, thus releasing the chlorofluorocarbons. These chlorofluorocarbons are collected by equipment for collecting low-concentration chlorofluorocarbons.

The steel plate, the resin plate, the linear object and the foamed resin that have been smashed roughly are fractionated by a wind-power separator utilizing the difference in specific gravity or the like.

The fractionated foamed resin is sent to a crusher and smashed further minutely, so that remaining chlorofluorocarbons are drawn out (a minute crushing process). As a method for collecting the chlorofluorocarbons for this case, a method described in JP 2679562 B is known, for example. After the foamed resin is smashed roughly into pieces having a size on the order of several cm, it is put into a hopper and sent to the crusher. In the process where an external mechanical force is applied in the crusher so as to crush the foamed resin, closed-cells therein are destroyed. Chlorofluorocarbons released from the closed-cells and the minutely crushed resin grains are sent to a bag filter together with the air, so that a gaseous component and the resin grains are separated. When the resin grains are heated and compressed in a volume reducer, any remaining chlorofluorocarbons are squeezed out also at this time.

Together with the air, the chlorofluorocarbons generated in the above processes are introduced into a container filled with activated carbon (adsorbent), thus allowing a rare chlorofluorocarbon component in the air to be once adsorbed in the activated carbon. Then, this activated carbon is heated to release chlorofluorocarbons, thereby taking out chlorofluorocarbons with a relatively high concentration. The air containing these concentrated chlorofluorocarbons is passed through a cooling device, so that the chlorofluorocarbons are liquefied and collected. The chlorofluorocarbons that have not been adsorbed in the activated carbon in the above description and the chlorofluorocarbons that have not been liquefied and separated in the cooling process are sent back to the hopper together with the air. In this manner, the chlorofluorocarbons contained in the foam can be separated and collected without being diffused into the air.

However, the above-described disassembling method has had the following problems.

In the rough smashing process and the minute crushing process, since the chlorofluorocarbons released from the foam into the air and solid materials are fractionated by a wind-power separating method, the concentration of chlorofluorocarbons is extremely low.

Because chlorofluorocarbons have a low boiling point, in order to cool down and liquefy rare chlorofluorocarbons directly without any adsorbing and releasing process by the activated carbon, it is essential to cool them down to an extremely low temperature that is considerably lower than $-40°$ C., as becomes clear from a vapor pressure curve shown in FIG. 14. As a result, large-scale and expensive cooling equipment is needed.

Accordingly, by concentrating chlorofluorocarbons through the adsorbing and releasing process using the activated carbon, the cooling temperature at the time of liquefying and collecting has been shifted to a higher side.

However, a large amount of the activated carbon is needed for adsorbing chlorofluorocarbons, and it is necessary to cool down or heat the large amount of the activated carbon having a low thermal conductivity to a temperature suitable for adsorbing and releasing. This takes a considerably long time. Also, for an actual continuous operation, it is necessary to prepare a plurality of containers filled with the activated carbon and switch them for the adsorbing and releasing, which results in still larger equipment.

As described above, the conventional method for collecting chlorofluorocarbons is extremely inefficient because the chlorofluorocarbons diffused in an extremely low concentration are once condensed using the activated carbon and then cooled down so as to be liquefied and separated. Furthermore, the equipment for carrying out these processes is large, raising equipment costs and operation costs considerably and impairing profitability seriously.

DISCLOSURE OF INVENTION

It is an object of the present invention to solye the problems described above and to provide a small destructive device that makes it possible to collect a foaming gas in foam in high concentrations. It is a further object of the present invention to provide a small collecting device and a small collecting system that can collect a foaming gas in foam in high concentrations at a low cost.

A destructive device of the present invention includes a pair of compression rollers, and a compressing and carrying device for compressing an object to be treated including a foam in substantially the same direction as a compressing direction of the pair of compression rollers and sending the object to an opposing portion of the pair of compression rollers.

Further, a foaming gas collecting device of the present invention includes the destructive device of the present invention, and a cover for covering at least an exit side of the pair of compression rollers.

Moreover, a foaming gas separating and collecting system of the present invention includes the foaming gas collecting device of the present invention, a cooling and liquefying device for cooling a foaming gas captured in the cover, together with a medium gas for collection in a compressed state, liquefying the foaming gas so as to separate and collect the foaming gas from the medium gas for collection, and a medium gas circulating device for returning the medium gas, from which the foaming gas has been separated, for collection, into the cover and filling the cover.

BEST MODE FOR CARRYING OUT THE INVENTION

Figure 1:
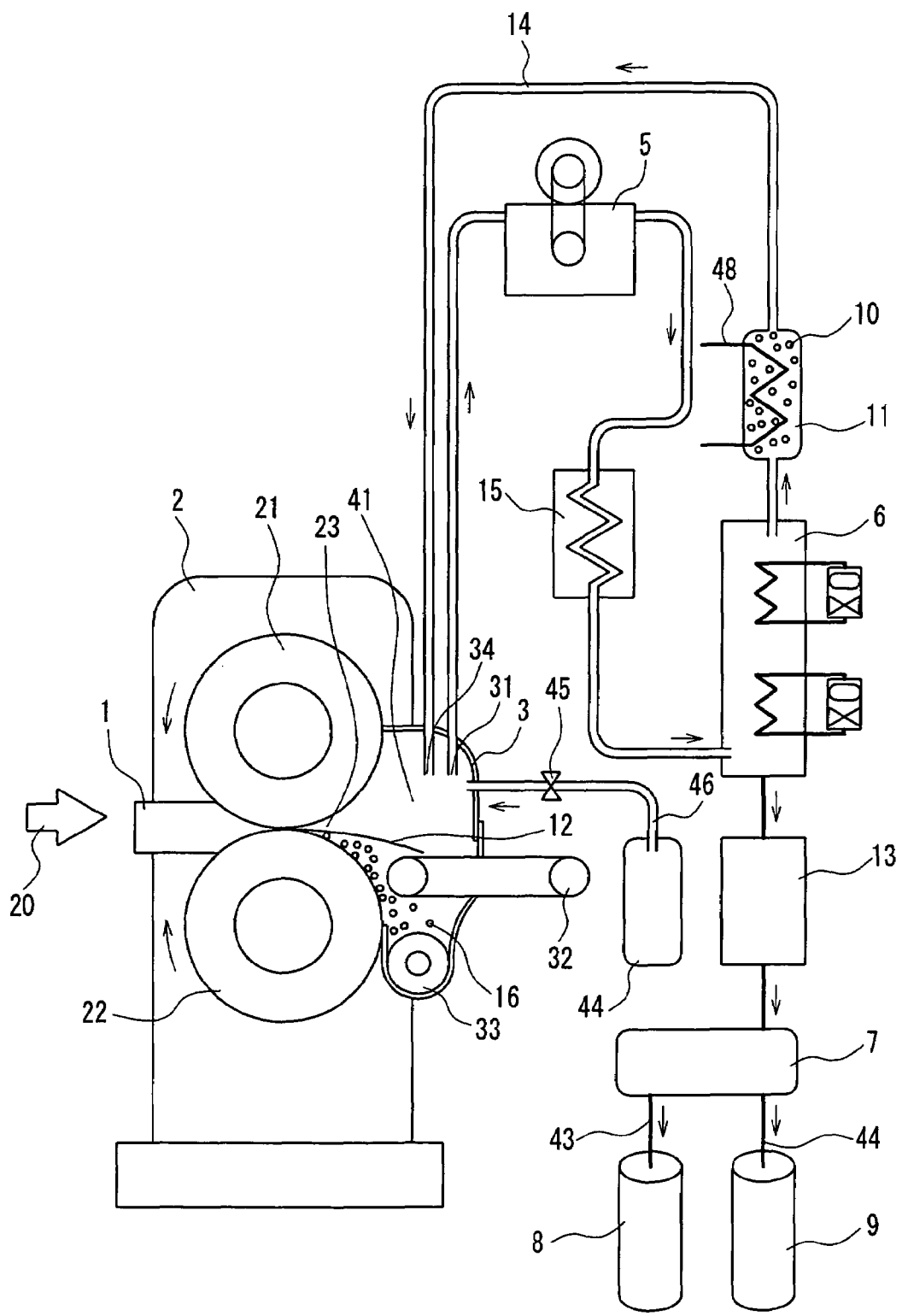
FIG. 1 is a schematic view showing an overall configuration (a compressing and carrying device is omitted) of an embodiment of a foaming gas separating and collecting system of the present invention.

A destructive device of the present invention includes a pair of compression rollers, and a compressing and carrying device for compressing an object to be treated including a foam in substantially the same direction as a compressing direction of the pair of compression rollers and sending the object to an opposing portion of the pair of compression rollers.

In accordance with the above-described destructive device of the present invention, it is possible to separate the foam into a foaming gas component and a solid component and to allow a foaming gas to burst out only in a limited area on an exit side of the pair of compression rollers. Therefore, the foaming gas can be taken out from the foam in high concentrations. Also, by compressing the object to be treated in advance with a compressing and carrying device, it is possible to send the object to be treated stably to the opposing portion of the pair of compression rollers regardless of the shape, size or structure of the object to be treated, leading to improved work efficiency.

In the above-described destructive device of the present invention, the object to be treated may include the foam and a metal plate or a resin plate that is layered on at least one surface of the foam. Even when the object to be treated contains a solid component other than the foam, it can be fed without separating such a solid component, leading to improved work efficiency.

Also, in the above-described destructive device of the present invention, it is preferable that the pair of compression rollers cause a compression fracture or a tensile fracture in a wall forming a closed-cell in the foam. By applying an extremely high pressure to a limited area, the compression fracture or the tensile fracture occurs in the wall. In this way, the wall is fractured reliably, so that the foaming gas in the foam is allowed to burst out to the limited area on the exit side of the pair of compression rollers and taken out thoroughly.

Further, in the above-described destructive device of the present invention, it is preferable that a foaming gas in the foam bursts out only on an exit side of the pair of compression rollers. Accordingly, a small cover is sufficient for capturing the foaming gas, and there is no need for a completely isolated chamber that covers an entire destructive device including a pair of compression rollers and its driving device, achieving downsizing of the entire device. Furthermore, the foaming gas can be taken out from the foam in high concentrations.

Next, a foaming gas collecting device of the present invention includes the above-described destructive device of the present invention, and a cover for covering at least an exit side of the pair of compression rollers.

In accordance with the above-described foaming gas collecting device of the present invention, the foaming gas that has been separated and burst out by the destructive device can be captured reliably by the small cover capable of covering the exit side of the pair of compression rollers. Consequently, the entire device can be downsized. Further, the foaming gas can be taken out in high concentrations.

Then, a foaming gas separating and collecting system of the present invention includes the above-described foaming gas collecting device of the present invention, a cooling and liquefying device for cooling a foaming gas captured in the cover, together with a medium gas for collection in a compressed state, liquefying the foaming gas so as to separate and collect the foaming gas from the medium gas for collection, and a medium gas circulating device for returning the medium gas, from which the foaming gas has been separated, for collection, into the cover and filling the cover.

In accordance with the above-described foaming gas separating and collecting system of the present invention, by providing the foaming gas collecting device of the present invention, the foaming gas can be taken out in high concentrations with a small device. Thus, it is possible to cool down, liquefy and separate the foaming gas without concentrating the foaming gas in a conventional adsorbing and releasing process using activated carbon. As a result, equipment can be downsized and simplified considerably, and equipment costs and operation costs can be reduced significantly. Accordingly, the foaming gas can be collected efficiently at a low cost.

Also, since the medium gas for collection containing the foaming gas is compressed into a high-pressure state and then cooled down and liquefied in the cooling and liquefying device, the condensation point can be raised, and a liquefaction rate can be improved if the cooling temperature is the same. Accordingly, it is possible to achieve a further reduction of the operation costs and an improvement in collection efficiency.

Furthermore, since the medium gas for collection is circulated and used by the medium gas circulating device, it is possible to prevent the foaming gas from leaking out of the system.

In the above-described foaming gas separating and collecting system of the present invention, it is preferable further to include an adsorbing device for passing the medium gas for collection, from which the foaming gas has been separated by the cooling and liquefying device, through a container filled with an adsorbent and capturing and collecting with the adsorbent the foaming gas remaining in the medium gas for collection. In this case, the medium gas for collection through the adsorbing device is returned to the cover. With this preferable configuration, since foaming gas can be separated and collected substantially completely from the medium gas for collection, the collection rate of the foaming gas improves. Also, water in the medium gas for collection is removed at the same time, thereby preventing the entering of condensed water in the liquefied material of the foaming gas or the freezing of water in the cooling and liquefying device.

Also, in the above-described foaming gas separating and collecting system of the present invention, it is preferable further to include an air curtain isolation device for isolating an inside and an outside of the cover from each other by allowing the medium gas for collection or a gas equivalent thereto to be expelled to a gap between the cover and at least one of the pair of compression rollers. With this preferable configuration, it is possible to prevent the entry of the air containing water into the medium gas for collection in the cover. Also, it is possible to prevent chlorofluorocarbons from leaking out of the cover.

Further, in the above-described foaming gas separating and collecting system of the present invention, it is preferable further to include a fractionating device having a filter function, in which many openings with a predetermined opening diameter and a predetermined opening ratio are formed, and the fractionating device is located on the exit side of the pair of compression rollers and in the cover. With this preferable configuration, in the case where the object to be treated includes a solid material other than the foam, crushed pieces of the foam and other nondestructive solids can be separated. Accordingly, it is possible to improve efficiency in the fractionating work afterwards.

In this case, it is preferable further to include a compressing and collecting device for discharging crushed pieces of the foam that have passed through the openings of the fractionating device while compressing the crushed pieces, and the compressing and collecting device is located on the exit side of the pair of compression rollers and in the cover. With this preferable configuration, since powder-like smashed pieces of the foam can be reduced in volume and integrated into a lump, it becomes easier to handle them afterwards.

Moreover, in the above-described foaming gas separating and collecting system of the present invention, it is prefer-able that the medium gas for collection is an inert gas. With this preferable configuration, it becomes possible to reduce the risk of fire or explosion even when the foaming gas contains a combustible component.

Additionally, in the above-described foaming gas separating and collecting system of the present invention, it is preferable further to include a cutting device for cutting and separating in advance a structure including a foam into pieces with a size that can be put in the destructive device. With this preferable configuration, it is possible to configure a system capable of separating and collecting wastes efficiently.

The following is a more specific description of the present invention, with reference to the accompanying drawings.

Figure 2A:
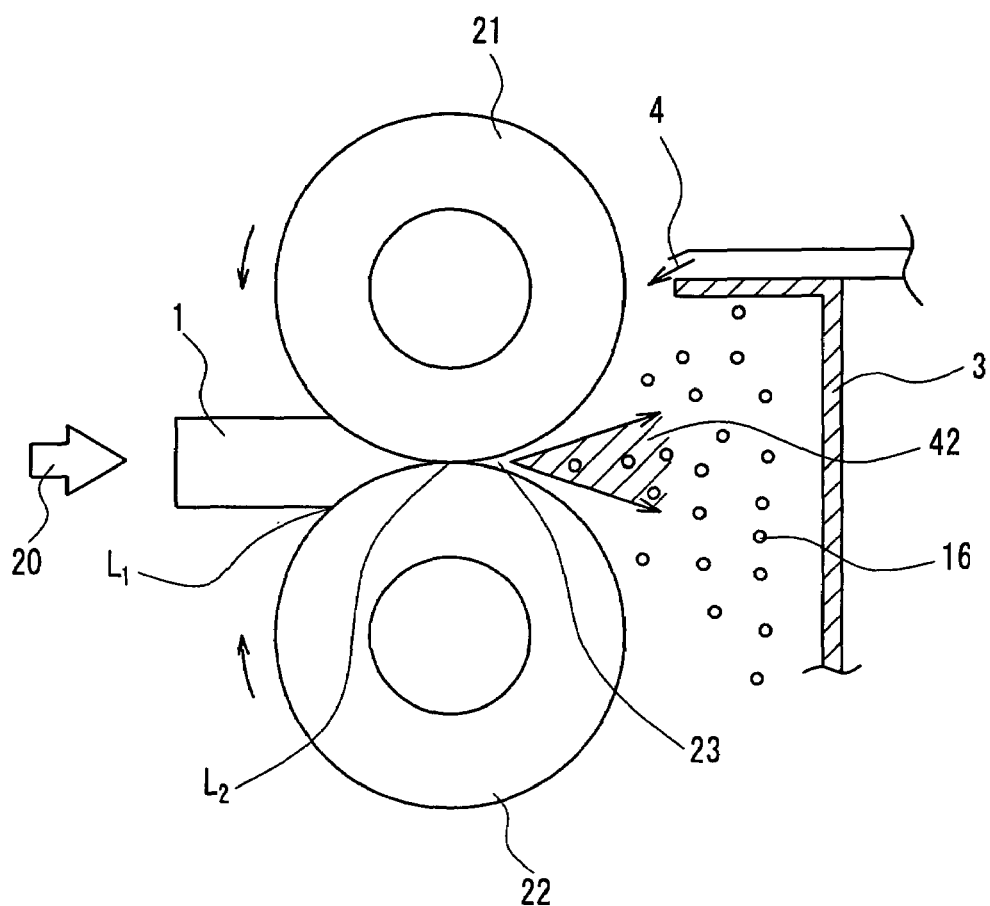
FIG. 2A is a schematic view for describing an operation of compression rollers in a destructive device of the present invention.
Figure 2B:
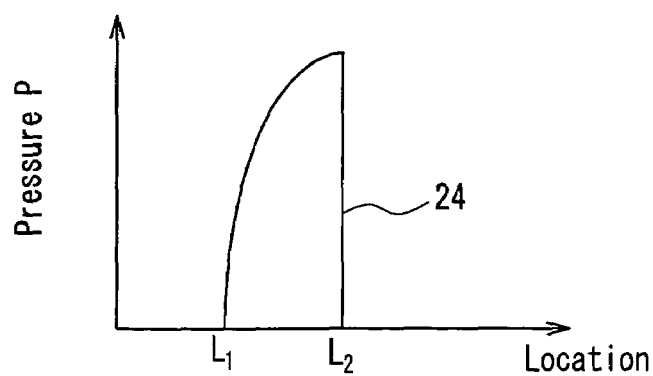
FIG. 2B is a conceptual view showing an internal stress distribution in foam, which is an object to be treated, passing through the compression rollers.

FIG. 1 is a view schematically showing an overall configuration of a foaming gas separating and collecting system in accordance with an embodiment of the present invention (a compressing and carrying device is omitted), FIG. 2A is a schematic view for describing an operation of compression rollers, and FIG. 2B is a conceptual view showing an internal stress distribution in foam, which is an object to be treated, passing through the compression rollers.

Figure 3A:
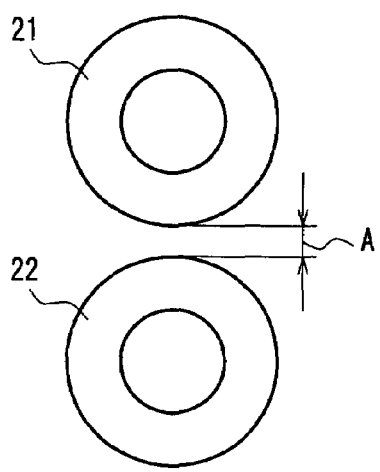
FIG. 3A is a side view of an example of a pair of compression rollers constituting the destructive device of the present invention.
Figure 3B:
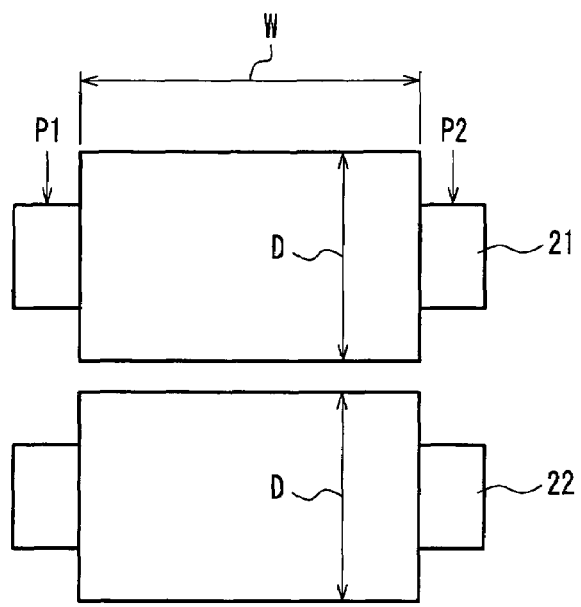
FIG. 3B is a front view thereof.

In FIGS. 1 and 2A, a foam 1 as an objected to be treated is introduced along a direction indicated by an arrow 20 into an opposing portion of a pair of compression rollers 21 and 22, which are disposed above and below and rotating in arrow directions, compressed (rolled) in a thickness direction so that a wall forming a closed-cell in the foam 1 is destroyed, thus taking out a foaming gas from the closed-cell. FIGS. 3A and 3B illustrate various conditions of the pair of compression rollers 21 and 22 used in an example of the present invention. FIG. 3A is a side view of the pair of compression rollers 21 and 22, and FIG. 3B is a front view thereof. The pair of compression rollers 21 and 22 have an effective portion with an outer diameter D of 410 mm and an effective length W of 600 mm. Loads P1 and P2 up to 1.13 MN (115 ton) respectively are applied to both ends of the rollers so that a gap A between the rollers is maintained substantially constant during a compressing process. Although the gap A is set according to the object to be treated, usually, it preferably is 1 mm or smaller and more preferably 0.5 mm or smaller.

The internal stress in the foam 1 when the foam 1 is passed through the gap A of the pair of compression rollers 21 and 22 to which extremely large loads are applied as described above will be discussed referring to FIGS. 2A and 2B. In FIG. 2B, the horizontal axis indicates a location of the foam 1 in a carrying direction, and the vertical axis indicates an internal stress P generated in the foam 1 in each location by the pair of compression rollers 21 and 22. The internal stress in the foam 1 starts to increase at location L1 where the foam 1 starts to contact the surface of the pair of compression rollers 21 and 22, the internal stress in the foam 1 becomes maximal (maximum compression point) at location L2 where the gap between the pair of compression rollers 21 and 22 is narrowest, and a compressive force drops sharply so as to form a maximum pressure gradient portion 24 on an exit side with respect to this maximum compression point L2. A wall forming a closed-cell in the foam 1 is destroyed at the maximum compression point L2. A foaming gas in the closed-cell bursts out only on the side of the maximum pressure gradient portion 24 where the pressure gradient drops sharply, namely, only in a space 23 on an exit side of the pair of compression rollers 21 and 22.

The process in which the wall forming the closed-cell in the foam 1 is destroyed and the foaming gas bursts out will be described more specifically referring to FIGS. 4A to 4E.

It should be noted that FIGS. 4A to 4E conceptually illustrate the bursting processes of the foaming gas, and the dimension of each portion is not true to life.

Figure 4A:
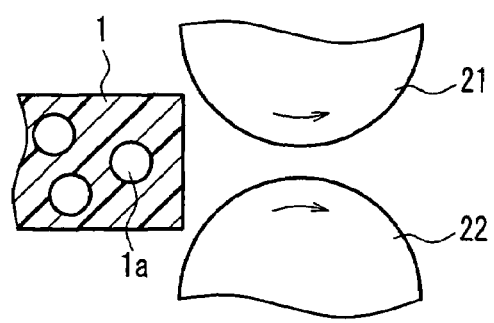
FIGS. 4A to 4E are views conceptually showing processes in which a foaming gas bursts out from the foam by the destructive device of the present invention.
Figure 4B:
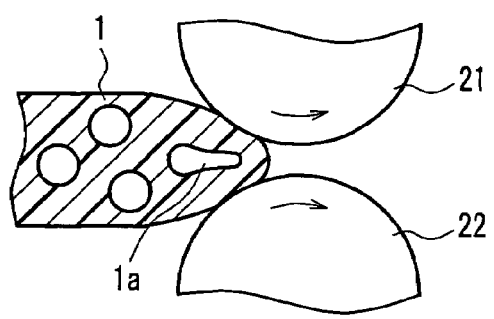
Figure 4C:
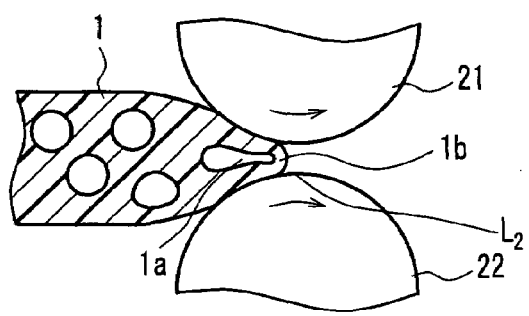
Figure 4D:
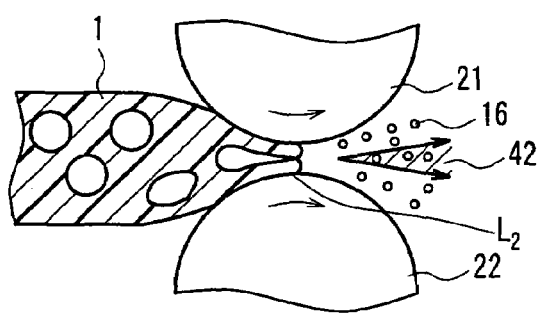
Figure 4E:
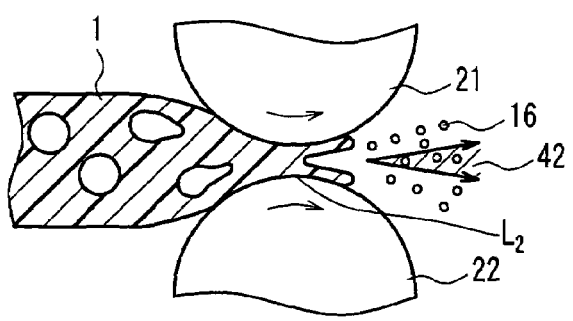

First, as shown in FIG. 4A, the foam 1 as the object to be treated is carried toward the opposing portion of the pair of compression rollers 21 and 22. Then, as shown in FIG. 4B, the foam 1 is compressed in the opposing portion of the pair of compression rollers 21 and 22, so that a closed-cell 1a inside starts to be deformed. Thereafter, as shown in FIG. 4C, when the closed-cell 1a approaches the maximum compression point L2, the closed-cell 1a is deformed considerably, so that is volume decreases and the pressure of the foaming gas inside rises sharply. At the same time, the compressive force applied to a wall 1b forming this closed-cell also rises sharply. Then, at the maximum compression point L2, the foaming gas in the closed-cell 1a finally is liquefied by the compressive force, the surfaces of opposing walls 1b come into intimate contact with each other, the compressive force by the pair of compression rollers 21 and 22 directly acts on the wall 1b so as to cause a compression fracture (a plastic fracture) in the wall 1b. As a result, the foaming gas in the closed-cell 1a vaporizes and expands rapidly so as to burst out to an area indicated by hatch lines 42 in FIG. 4D on the side of the maximum compression gradient portion 24, and at the same time, fine particles 16, which are fine powders obtained by crushing solid components including the wall 1b that have constituted the foam 1, also are scattered on the same side. Alternatively, depending on the compression conditions of the pair of compression rollers 21 and 22 or the temperature, the foaming gas in the closed-cell 1a is compressed without being liquefied at the maximum compression point L2, so that an expanding force of the foaming gas may exceed a tensile force of the wall 1b of the foam 1, causing a tensile fracture (a plastic fracture) in the wall as illustrated in FIG. 4E. In this case, the foaming gas in the closed-cell 1a also expands rapidly so as to burst out to the area indicated by the hatch lines 42 in FIG. 4E on the side of the maximum compression gradient portion 24, and at the same time, the fine particles 16, which are fine powders obtained by crushing solid components including the wall 1b that have constituted the foam 1, also are scattered on the same side.

The dimension and compression conditions of the pair of compression rollers 21 and 22 are set so that the above-mentioned fracture occurs in the wall of the closed-cell in the foam 1. In this way, the area of the bursting direction of the foaming gas (the portion indicated by the hatch lines 42) is limited on the exit side of the pair of compression rollers 21 and 22, and the angle of divergence thereof also is substantially constant. This phenomenon continues as long as the foam 1 is supplied to the pair of rotating compression rollers 21 and 22.

Now, a cover 3 covering the space 23 on the exit side of the pair of compression rollers 21 and 22 is provided so as to form a closed space (a chamber) surrounded by the pair of compression rollers 21 and 22 and the cover 3 and fill this closed space with a medium gas for collection 41 in advance. This makes it possible to capture the foaming gas bursting out on the exit side of the pair of compression rollers 21 and 22 in high concentrations. The cover 3 preferably is designed to have a shape that helps reduce foaming gas leakage and minimize the inner volume of the chamber.

Together with the medium gas for collection 41, the foaming gas 42 is sucked from a suction inlet 31 provided in the chamber, compressed by a compressing device 5 (for example, at 490 kPa (5 kgf/cm$^2$) or more), cooled down suitably by a water cooling device 15, and then guided to a cooling and liquefying device 6 so as to be cooled down to a condensation point or lower (for example, −40° C.) and liquefied. The liquefied material of the foaming gas component is collected in a liquefied material storage tank 13. Since this liquefied material contains water that has been contained in the medium gas for collection 41 as well, the liquefied material 43 of the foaming gas and water 44 are separated through a generally used water separator 7 and collected into containers 8 and 9, respectively.

Figure 14:
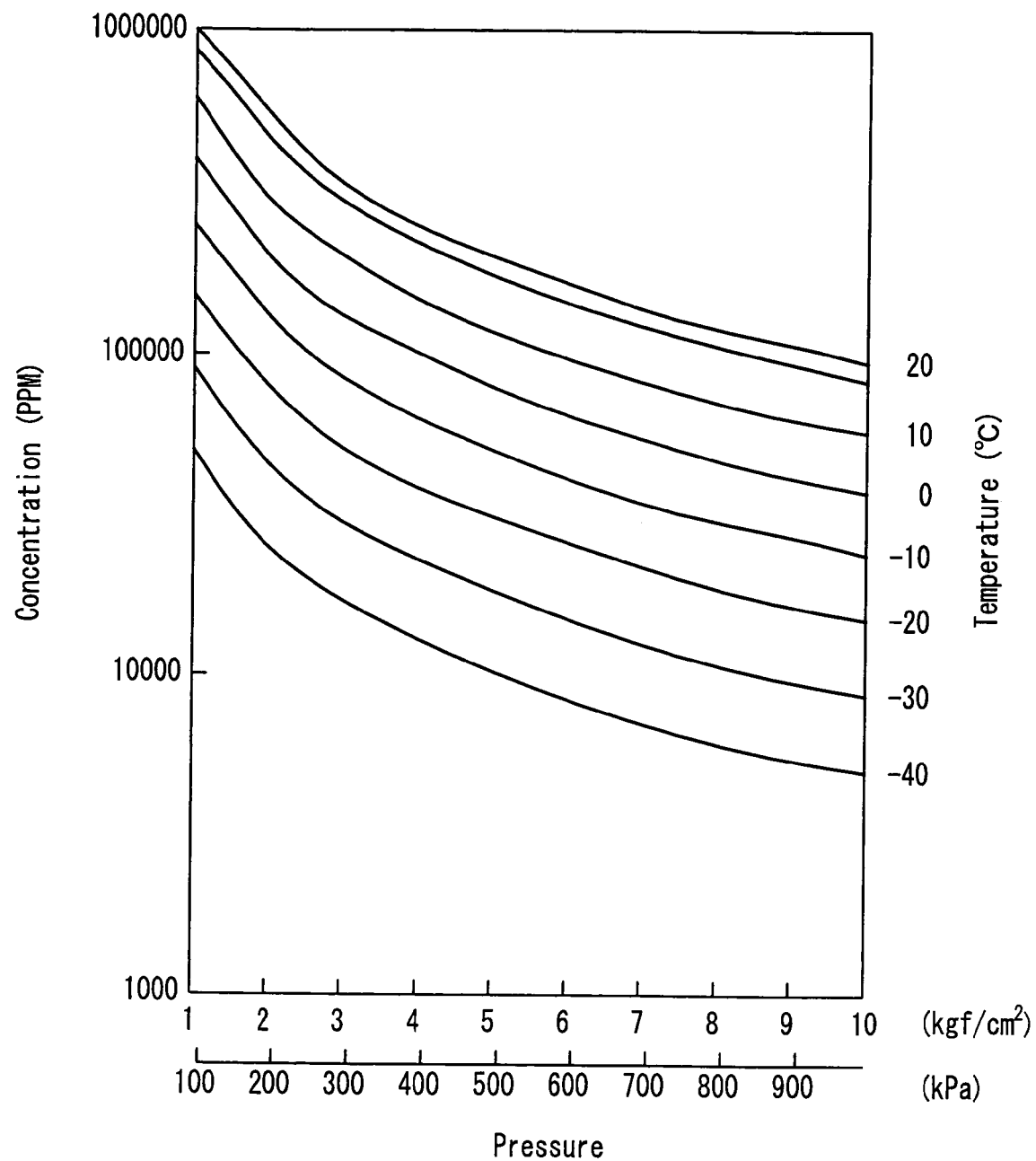
FIG. 14 is a view showing a vapor pressure curve of CFC-11.

In the above description, the foaming gas 42 is first brought to a high-pressure state together with the medium gas for collection 41 before being cooled down to the condensation point or lower for liquefaction and collection of the foaming gas. As becomes clear from the vapor pressure characteristics shown in FIG. 14, this makes it possible to set a practical condensation point according to the concentration of the foaming gas component 42, allowing low-cost and efficient liquefaction and collection. Further, the liquefaction rate can be improved, leading to a higher collection rate.

As described above, the separating and collecting system of the present invention allows the foaming gas to burst out in an extremely limited area by the pair of compression rollers 21 and 22, and therefore, by providing the cover 3 in this limited area, it is possible to reduce the inner volume of the chamber. Thus, the concentration of the foaming gas component in the medium gas for collection 41 becomes relatively high, making it possible to liquefy and separate the foaming gas without any adsorbing and releasing process of the foaming gas by the activated carbon as in the conventional case.

On the other hand, after the foaming gas 42 is liquefied and separated in the cooling and liquefying device 6, the medium gas for collection returns to the chamber through a return pipe 14 and is recycled as the medium gas for collection 41. At this time, in the medium gas for collection that has passed through the cooling and liquefying device 6, there remains the foaming gas and water vapor corresponding to the vapor pressure at the cooling temperature in the cooling and liquefying device 6. Thus, it is preferable that the medium gas for collection is guided to an adsorbing device 11 filled with activated carbon 10 so that the foaming gas and the water vapor remaining in the medium gas for collection are adsorbed in and fixed to the activated carbon 10. In this manner, the medium gas for collection from which the foaming gas component and water have been removed completely is sent via the return pipe 14 and introduced into the chamber from a return port 34 provided in the chamber.

In the case of a continuous operation of the above-described processes, a plurality of the adsorbing devices 11 filled with the activated carbon 10 are provided and used by switching them sequentially. By heating the activated carbon 10 with a heating medium 48, the foaming gas component adsorbed in and fixed to the activated carbon 10 is released from the activated carbon 10 into the medium gas for collection. This medium gas for collection containing the foaming gas component is introduced to the cooling and liquefying device 6 via a pipe, which is not shown in this figure, together with the medium gas for collection from the chamber, and then the foaming gas component is liquefied and separated. This process may be an application of a conventionally used general process, and thus, its detailed description and illustration by the drawings will be omitted here.

It is desired to minimize the entry of the air containing water vapor from outside into the chamber. It also is desired to prevent the leakage of the bursting foaming gas to the outside of the chamber. Accordingly, as shown in FIG. 2, it is preferable that the medium gas for collection or a gas 4 equivalent thereto is expelled to a gap between the compression roller 21 and the cover 3, thereby providing an air curtain isolation device for isolating from each other the inside and outside of the cover 3. Although FIG. 2 shows the air curtain isolation device provided in the gap between the compression roller 21 and the cover 3, it is preferable that another air curtain isolation device also should be provided in the gap between the compression roller 22 and the cover 3.

Since the gap A in the opposing portion of the pair of compression rollers 21 and 22 (see FIG. 3A) is designed to be very narrow and the surfaces of the compression rollers 21 and 22 are smooth, merely carrying the foam 1 as the object to be treated to an entrance side of the pair of rotating compression rollers 21 and 22 will let the foam 1 slip on the surfaces of the pair of compression rollers 21 and 22 and not be caught between the rollers. Accordingly, in the present invention, a compressing and carrying device is provided on the entrance side of the pair of compression rollers 21 and 22. The compressing and carrying device compresses the foam 1 in advance in substantially the same direction as a compressing direction of the pair of compression rollers 21 and 22 (pre-compression) so as to reduce the thickness of the foam 1 and pushes the foam 1 into the opposing portion of the pair of compression rollers 21 and 22. This makes it easier for the foam 1 to be caught in the opposing portion of the pair of compression rollers 21 and 22, improving a work efficiency. In particular, even when the foam 1 is large or when a metal plate, a resin plate and the like are layered in a surface layer, stable catching characteristics can be secured.

Figure 5:
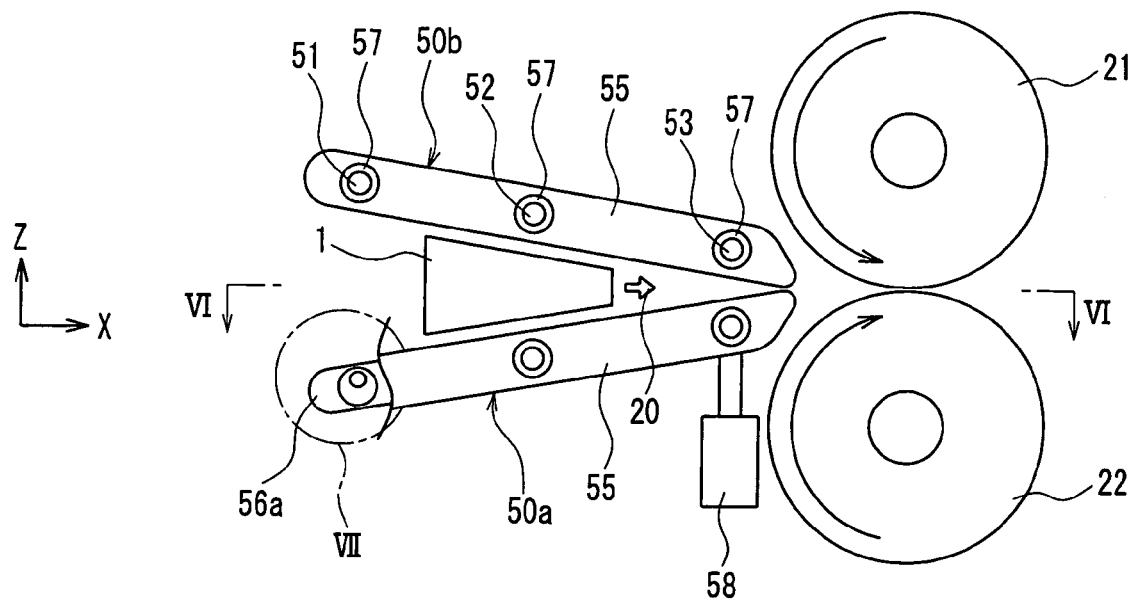
FIG. 5 is a side view of an embodiment of a compressing and carrying device of the present invention.
Figure 6:
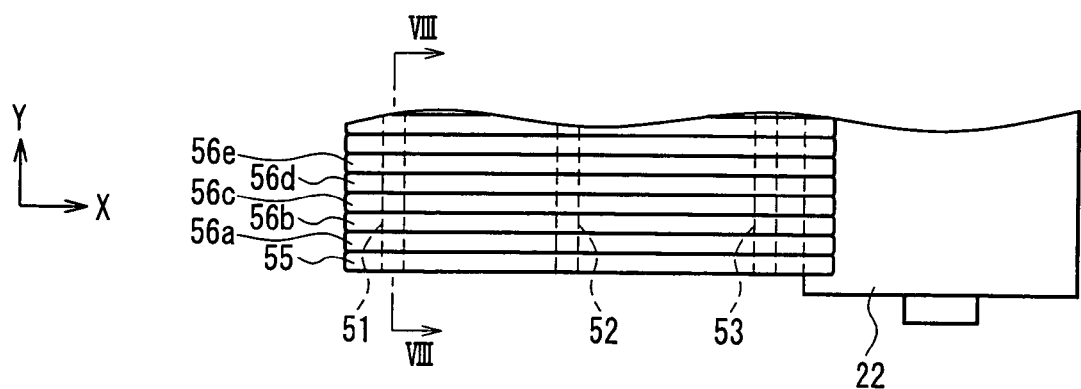
FIG. 6 is a plan view, taken along line VI-VI in FIG. 5 seen from a direction indicated by arrows, of an embodiment of the compressing and carrying device of the present invention.
Figure 7:
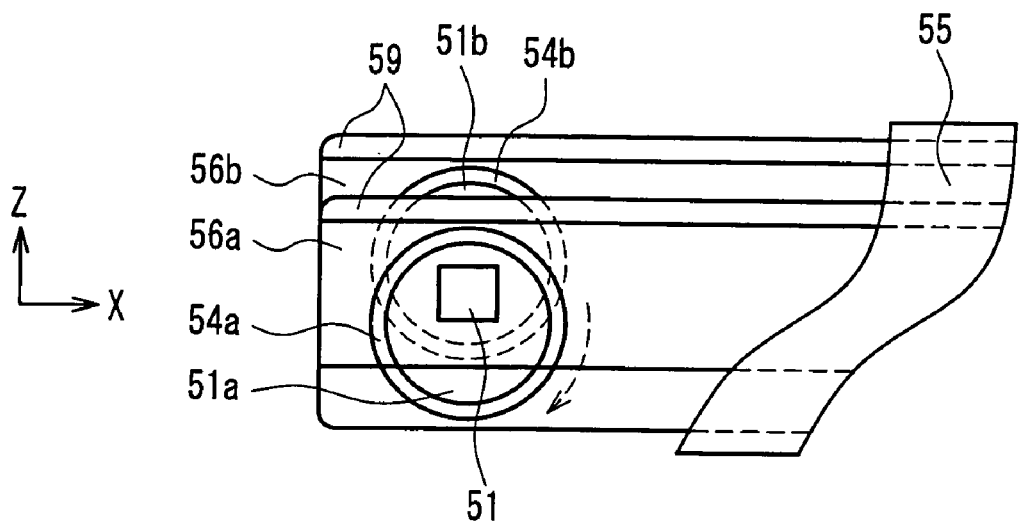
FIG. 7 is an enlarged view of a portion VII in FIG. 5.
Figure 8:
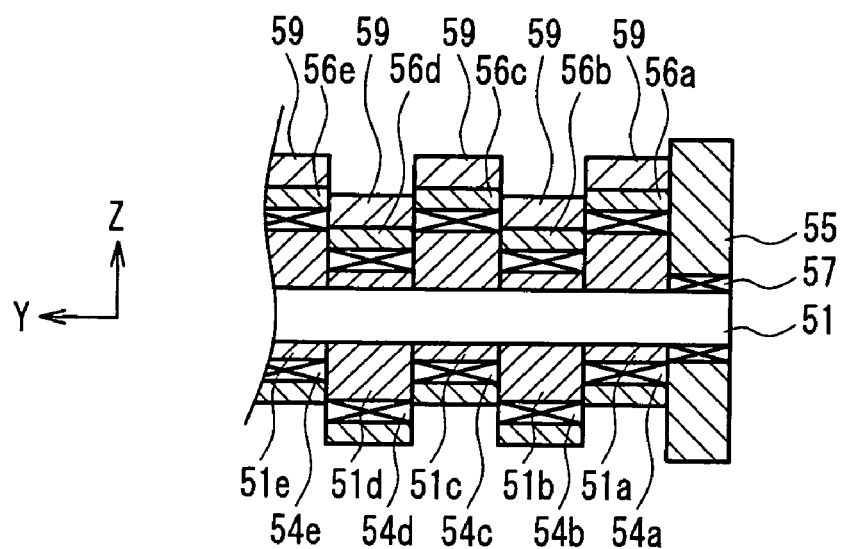
FIG. 8 is a sectional view taken along line VIII-VIII in FIG. 6 seen from a direction indicated by arrows.

Although a specific configuration of such a compressing and carrying device is not particularly limited, an example thereof will be described referring to FIGS. 5 to 8. FIG. 5 is a side view of the compressing and carrying device, FIG. 6 is a plan view taken along line VI-VI of FIG. 5 seen from a direction indicated by arrows, FIG. 7 is an enlarged view of a portion VII in FIG. 5, and FIG. 8 is a sectional view taken along line VIII-VIII of FIG. 6 seen from a direction indicated by arrows. For convenience in description below, as shown in FIGS. 5 to 8, an XYZ three-dimensional rectangular coordinate system is set such that an X axis indicates a horizontal direction substantially in parallel with a direction in which the foam 1 is carried, a Y axis indicates a direction of the rotation axes of the pair of compression rollers 21 and 22 and a Z axis indicates a vertical direction.

The compressing and carrying device in the present example includes a lower carrier portion 50a and an upper carrier portion 50b. The lower carrier portion 50a and the upper carrier portion 50b have substantially the same configuration and are arranged substantially symmetrically with respect to a XY plane.

Each of the lower carrier portion 50a and the upper carrier portion 50b includes rotating shafts 51, 52 and 53 disposed in a Y-axis direction, a pair of shaft fixing plates 55 rotatably supporting both ends of the rotating shafts 51, 52 and 53 via bearings 57, and floating members 56a, 56b, 56c, 56d, 56e, . . . arranged between the pair of shaft fixing plates 55. The longitudinal direction of the floating members 56a, 56b, 56c, 56d, 56e, . . . is included in an XZ plane, and the rotating shafts 51, 52 and 53 penetrate each of the floating members 56a, 56b, 56c, 56d, 56e, . . . . On an outer periphery of each of the rotating shafts 51, 52 and 53, eccentric cams 51a, 51b, 51c, 51d, 51e . . . are formed sequentially in an X-axis direction. The floating members 56a, 56b, 56c, 56d, 56e, . . . are joined to the eccentric cams 51a, 51b, 51c, 51d, 51e . . . of each of the rotating shafts 51, 52 and 53 via eccentric cam bearings 54a, 54b, 54c, 54d, 54e, . . . . In other words, for example, the floating member 56a is joined to each of the eccentric cams 51a of the rotating shaft 51, the eccentric cam 51a of the rotating shaft 52 and the eccentric cam 51a of the rotating shaft 53 via the eccentric cam bearing 54a. The eccentric cams of each of the rotating shafts 51, 52 and 53 joined to the same floating member have the same phase. On the other hand, the eccentric cams joined to the adjacent floating members have different phases. Accordingly, the phases of the eccentric cams 51a, 51b, 51c, 51d, 56e, . . . are shifted periodically or randomly in a range up to ±180°. The joint of each of the rotating shafts 51, 52 and 53 to the eccentric cam is formed to have a regular polygonal cross-section as shown in FIG. 7 (a square in FIG. 7), allowing an easy setting of the phase of each eccentric cam.

The rotating shafts 51, 52 and 53 of the lower carrier portion 50a and the upper carrier portion 50b constituted as above are rotated in synchronization using a gear or a chain, so that each of the floating members 56a, 56b, 56c, 56d, 56e, . . . moves like undulations in the XZ plane. Since the phases of the movements of the floating members 56a, 56b, 56c, 56d, 56e, . . . are different from each other, an effect of carrying the foam 1 in a direction indicated by an arrow 20 is produced.

Furthermore, the space between the lower carrier portion 50a and the upper carrier portion 50b is set to be narrower toward the side of the opposing portion of the pair of compression rollers 21 and 22, thereby allowing the foam 1 between the lower carrier portion 50a and the upper carrier portion 50b to be compressed gradually in its thickness direction (the Z-axis direction) as it is carried in the direction of the arrow 20.

As a result, with this compressing and carrying device, since the foam 1 is compressed to be thinner and then pushed into the opposing portion of the pair of compression rollers 21 and 22, the foam 1 is caught without slipping on the surfaces of the compression rollers 21 and 22.

Incidentally, the surface of each floating member 56a, 56b, 56c, 56d, 56e, . . . on the side contacting the foam 1 is provided with a carrier surface 59 having grooves forming sawtooth-shaped roughness or the like, making it possible to achieve a more reliable carrying of the foam 1 in the direction of the arrow 20. Further, the carrier surface 59 is made replaceable by separating it from each floating member 56a, 56b, 56c, 56d, 56e, . . . , thereby improving maintenance when the rough grooves have worn away.

Moreover, the space between the lower carrier portion 50a and the upper carrier portion 50b on the side of the compression rollers 21 and 22 is made adjustable by an actuator 58 such as a hydraulic cylinder, which makes it possible to prevent damage to the device by increasing the space between the lower carrier portion 50a and the upper carrier portion 50b immediately when there occurs an abnormal increase in driving loads of the rotating shafts 51, 52 and 53, for example, an intrusion of incompressible materials.

Figure 9A:
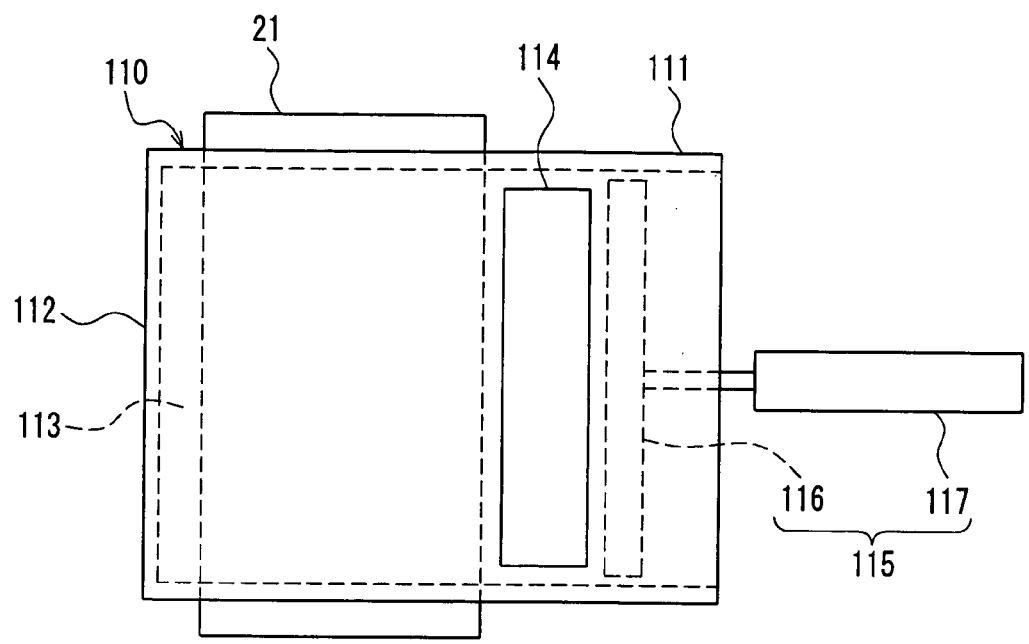
FIG. 9A is a top view of another embodiment of the compressing and carrying device of the present invention.
Figure 9B:
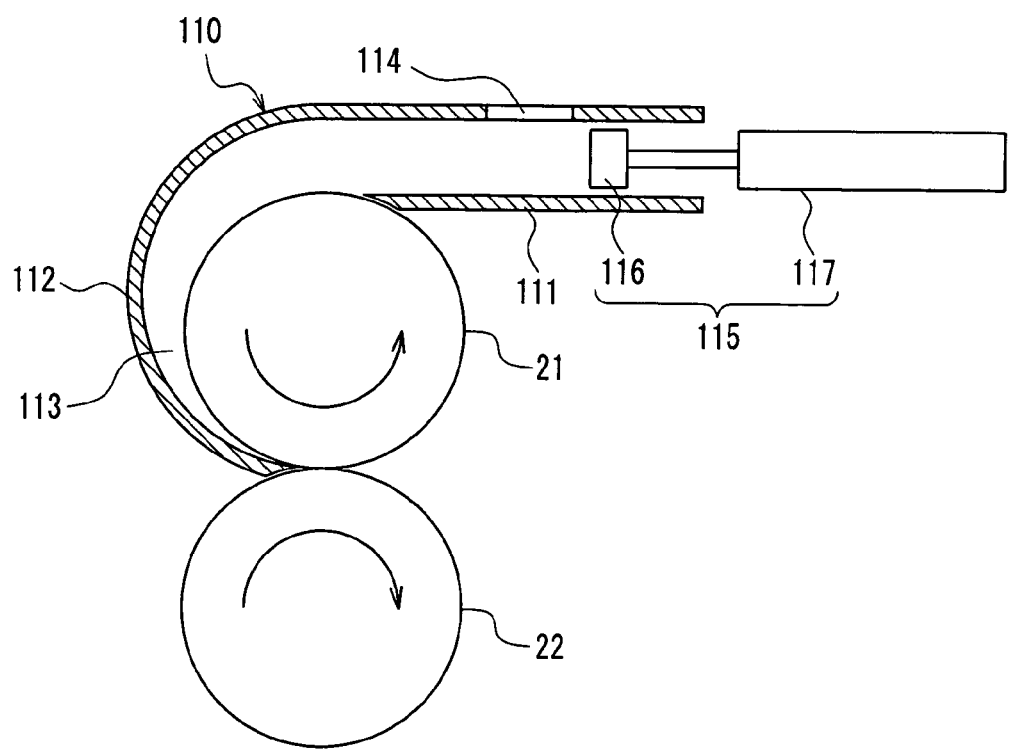
FIG. 9B is a side view thereof.

Another example of the configuration of the compressing and carrying device will be described referring to FIGS. 9A and 9B. FIG. 9A is a top view seen from a direction perpendicular to the rotation axes of the pair of compression rollers 21 and 22, and FIG. 9B is a side view seen from a direction of the rotation axes.

A compressing and carrying device 110 of the present example has a feeding portion 111 for guiding foam to the opposing portion of the pair of compression rollers 21 and 22 and a sending portion 115 for sending the foam in the feeding portion 111 to the side of the opposing portion. An internal space of the feeding portion 111 has a substantially rectangular cross-section. The feeding portion 111 has an introducing portion 113 provided with an introduction wall 112 facing a part of an outer peripheral surface of the upper compression roller 21. The introducing portion 113 extends to the vicinity of the opposing portion of the pair of compression rollers 21 and 22. The space between the introduction wall 112 and the outer peripheral surface of the compression roller 21 gradually narrows down toward the opposing portion. The other end of the feeding portion 111 is provided with the sending portion 115. An upper portion of the feeding portion 111 on the side closer to the sending portion 115 is provided with an opening 114, through which the foam is supplied. The sending portion 115 includes a piston 116 for moving the foam supplied into the feeding portion 111 toward the introducing portion 113 and an actuator 117 (for example, a hydraulic cylinder, or a driving motor and a feed screw) for reciprocating the piston 116.

The foam that has dropped through the opening 114 into the feeding portion 111 is sent on the side of the introducing portion 113 by the piston 116 of the sending portion 115. The introduction wall 112 of the introducing portion 113 faces the outer peripheral surface of the compression roller 21. Thus, the foam supplied to the introducing portion 113 moves toward the opposing portion of the pair of compression rollers 21 and 22 along with the movement of the outer peripheral surface of the compression roller 21. Further, the space between the introduction wall 112 and the outer peripheral surface of the compression roller 21 gradually narrows down toward the opposing portion. Therefore, as the foam moves toward the opposing portion of the pair of compression rollers 21 and 22, a contact pressure between the foam and the outer peripheral surface of the compression roller 21 increases. As a result, slip between the foam and the outer peripheral surface of the compression roller 21 decreases, so that the foam is supplied to the opposing portion reliably. Moreover, in this process, the foam is compressed in substantially the same direction as the compressing direction of the pair of compression rollers 21 and 22. Consequently, the foam is caught without slipping on the surfaces of the compression rollers 21 and 22.

Figure 10A:
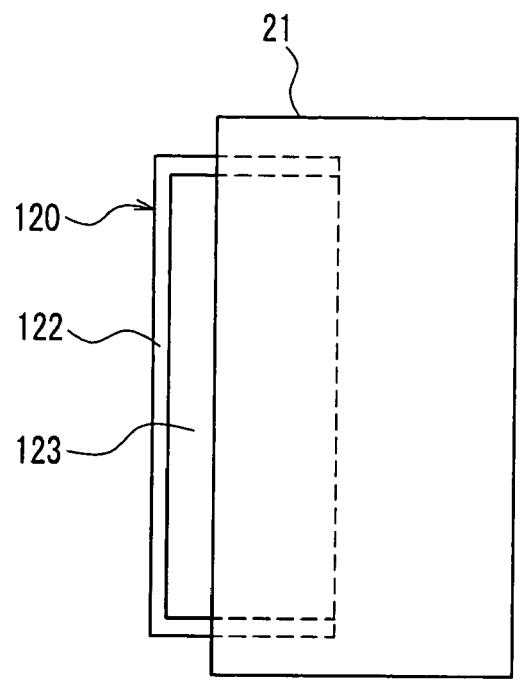
FIG. 10A is a top view of yet another embodiment of the compressing and carrying device of the present invention.
Figure 10B:
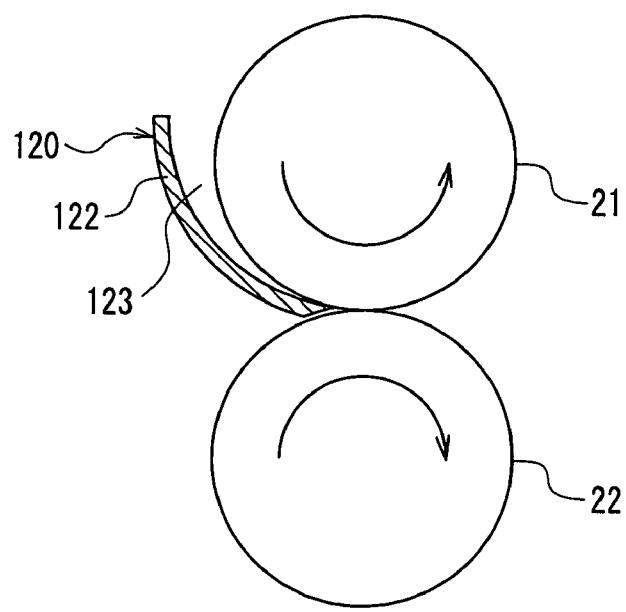
FIG. 10B is a side view thereof.

Yet another example of the configuration of the compressing and carrying device will be described referring to FIGS. 10A and 10B. FIG. 10A is a top view seen from a direction perpendicular to the rotation axes of the pair of compression rollers 21 and 22, and FIG. 10B is a side view seen from a direction of the rotation axes.

A compressing and carrying device 120 of the present example has an introducing portion 123 provided with an introduction wall 122 facing a part of the outer peripheral surface of the upper compression roller 21. The introducing portion 123 extends to the vicinity of the opposing portion of the pair of compression rollers 21 and 22. The space between the introduction wall 122 and the outer peripheral surface of the compression roller 21 gradually narrows down toward the opposing portion. The introduction wall 122 faces the outer peripheral surface of the compression roller 21 at an angle in the range of slightly smaller than about 90°, and the foam is supplied through an upward-facing opening of the introducing portion 123.

The foam that has dropped into the introducing portion 123 moves toward the opposing portion of the pair of compression rollers 21 and 22 along with the movement of the outer peripheral surface of the compression roller 21. Further, the space between the introduction wall 122 and the outer peripheral surface of the compression roller 21 gradually narrows down toward the opposing portion. Therefore, as the foam moves toward the opposing portion of the pair of compression rollers 21 and 22, a contact pressure between the foam and the outer peripheral surface of the compression roller 21 increases. As a result, the slip between the foam and the outer peripheral surface of the compression roller 21 decreases, so that the foam is supplied to the opposing portion reliably. Moreover, in this process, the foam is compressed in substantially the same direction as the compressing direction of the pair of compression rollers 21 and 22. Consequently, the foam is caught without slipping on the surfaces of the compression rollers 21 and 22.

Figure 11:
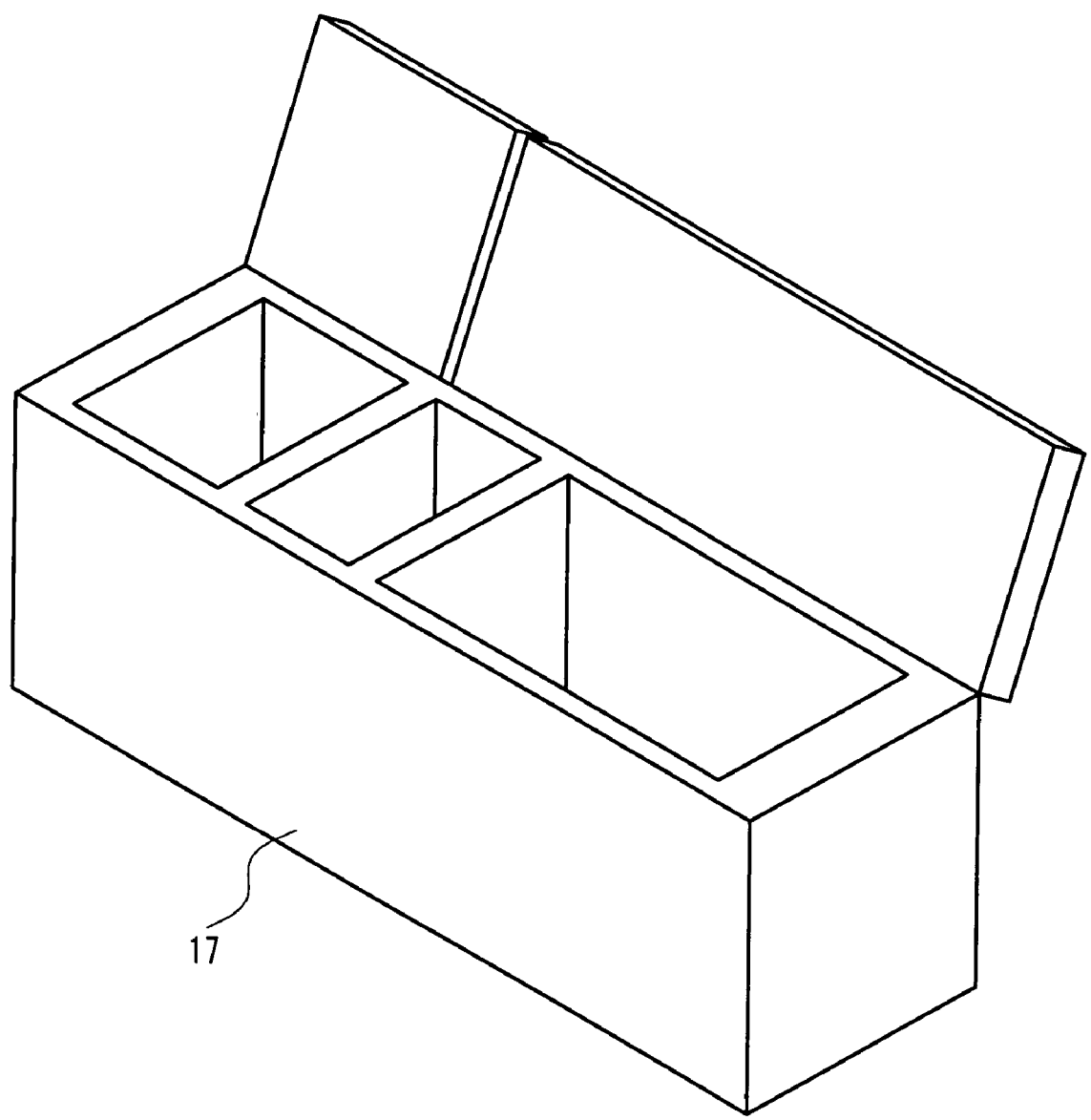
FIG. 11 is a schematic perspective view showing a heat-insulating housing of a discarded refrigerator.
Figure 12:
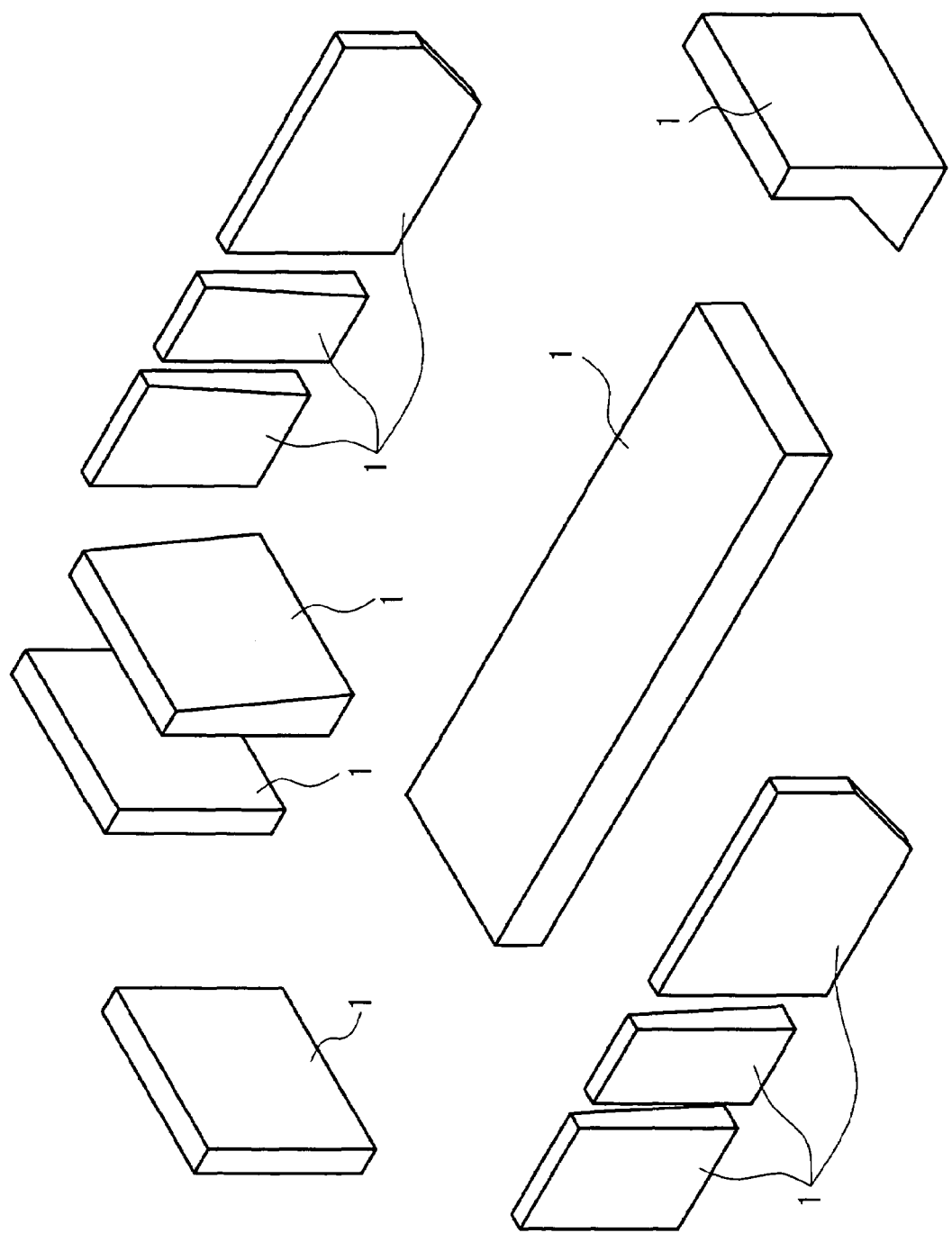
FIG. 12 is a schematic perspective view showing how the heat-insulating housing of the discarded refrigerator is cut and separated into a plurality of pieces.

The separating and collecting system of the present invention can be applied to any fields in which the foaming gas needs to be separated from the foam and collected. As an example, the application to disassembling and collecting of a heat-insulating housing of a discarded refrigerator will be described. First, a refrigerant (for example, chlorofluorocarbons) and a refrigeration oil are collected from the discarded refrigerator, and then a compressor is removed, thus obtaining a heat-insulating housing 17 as shown in FIG. 11. Next, the heat-insulating housing 17 is stripped of doors and cut into a plurality of suitable-sized pieces 1 as shown in FIG. 12. Although the method for cutting is not particularly limited, it is preferable to carry out cutting efficiently using a cutting device described in, for example, JP 2000-271926 A because the heat-insulating housing 17 of the refrigerator has a layered foam serving as a heat insulator whose one surface is a thin steel plate and the other surface is a resin plate and further has pipes and electric wirings embedded in the foam.

Figure 13:
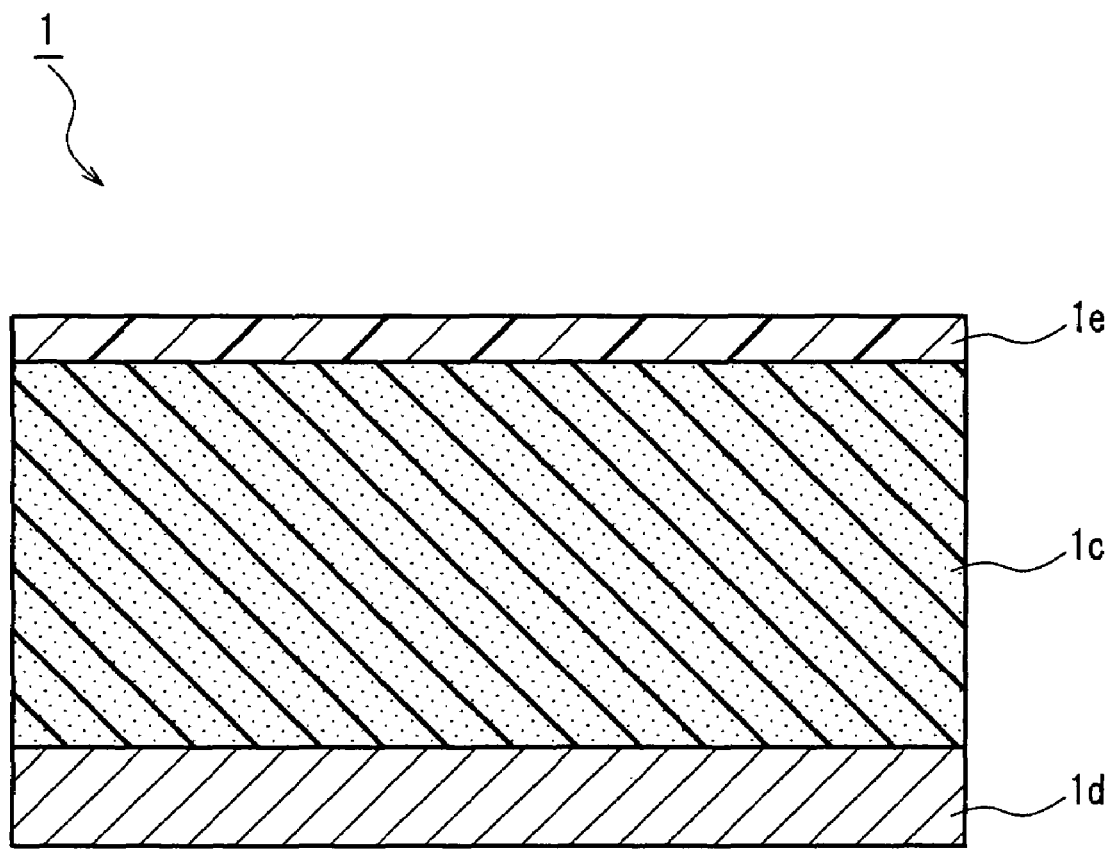
FIG. 13 is a sectional view showing a structure of the piece shown in FIG. 12.

FIG. 13 illustrates an exemplary structure of the piece 1. The piece 1 includes a foam (urethane foam) layer 1c, a 0.6 mm thick steel plate id layered on one surface thereof, and a 0.2 mm thick resin plate le layered on the other surface thereof.

In the separating and collecting system of the present invention, it is possible to feed the piece 1 between the pair of compression rollers 21 and 22 without separating the steel plate 1d and the resin plate 1e from the foam layer 1c.

In FIG. 1, an object to be treated (piece) 1 is compressed and crushed by a compression roller device 2 and separated into a gaseous component (a foaming gas) and a solid component. In the solid component, a foamed resin component is smashed into the fine particles 16 at the time of bursting out the foaming gas (see FIG. 2), whereas the steel plate 1d and the elastic resin plate le that are layered on the object to be treated 1 and the metal pipes that are embedded therein are not pulyerized. The separating and collecting system according to the present embodiment includes a fractionating device 32 for, from the pulyerized fine particles 16, fractionating and capturing other bulky components 12 such as the steel plate 1d, the resin plate 1e and the like that are not pulyerized in a lower portion on the exit side of the pair of compression rollers 21 and 22 in the chamber, and further below, a compressing and collecting device 33 for discharging to the outside of the chamber the fine particles 16 obtained by smashing the resin component of the foam layer 1c while compressing them.

The fractionating device 32 includes a mesh endless belt having a filter function in which many openings with a predetermined opening diameter and a predetermined opening ratio are formed so as to pass the fine particles 16 and block the bulky components 12 such as the steel plate 1d and the resin plate 1e that are larger than the fine particles 16, and a pair of driving rollers for tensioning and carrying the endless belt. The bulky components 12 that are caught by the fractionating and carrying device 32 are placed on the endless belt and carried to the outside of the chamber.

The compressing and collecting device 33 includes, for example, a screw having a pitch and/or an outer diameter narrowing toward its tip, and the rotation of the screw causes the fine particles 16 to be carried in its rotation axis direction, thus achieving integration and volume reduction.

In this manner, the object to be treated can be fractionated into the foaming gas as the gaseous component and the bulky components 12 and a lump of the fine particles 16 of the foamed resin as the solid component and then collected.

The separating and collecting system of the present invention mainly aims to separate and collect chlorofluorocarbon (halogenated hydrocarbon)-based foam that may damage the global environment. However, since alternatives for chlorofluorocarbons, non-chlorofluorocarbons and a combustible gas component (for example, cyclopentane) already have replaced the foaming gas used in the foam, they are mixed in the discarded foam.

As an application of the separating and collecting system of the present invention in response to this situation, it is preferable that a high-pressure container for inert gas supply 44, an inert gas pipe 46 and a switching valye 45 as shown in FIG. 1 are provided so as to fill an inert gas in the chamber as the medium gas for collection immediately as necessary so that, as the medium gas for collection to be filled in the chamber, the gas substituted by an inert gas such as a nitrogen gas can be used or the gas combined with the inert gas to such a degree as not to reach an explosive limit of the combustible gas component can be used. This makes it possible to suppress the risk of fire or explosion even when the foaming gas contains a combustible component.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

The invention claimed is:

1. A foaming gas separating and collecting system comprising:
   a destructive device comprising a pair of opposed compression rollers for compressing in the opposing direction, in an opposing portion of the pair of compression rollers, an object to be treated comprising a foam, and a compressing and carrying device, disposed upstream of the pair of compression rollers, for sending the object to the opposing portion of the pair of compression rollers; and
   a cover for covering at least an exit side of the pair of compression rollers;
   wherein the compressing and carrying device comprises a lower carrier potion and an upper carrier portion that are opposed to each other,
   a space between the lower carrier portion and the upper carrier portion is narrower toward a side of the opposing portion of the pair of compression rollers,
   each of the lower carrier portion and the upper carrier portion comprises a plurality of floating members whose longitudinal direction corresponds to a carrying direction, a rotation shaft penetrating the plurality of floating members, and a plurality of eccentric cams disposed between the plurality of floating members and the rotating shaft, and
   the object is pre-compressed by the compressing and carrying device and then compressed by the pair of compression rollers in substantially the same direction as a direction of the pre-compression.

2. A foaming gas separating and collecting system comprising: the foaming gas collecting device according to claim 1;
   a cooling and liquefying device for cooling a foaming gas captured in the cover, together with a medium gas for collection in a compressed state, liquefying the foaming gas so as to separate and collect the foaming gas from the medium gas for collection; and
   a medium gas circulating device for returning the medium gas for collection, from which the foaming gas has been separated, into the cover and filling the cover.

3. The foaming gas separating and collecting system according to claim 2, farther comprising an adsorbing device for passing the medium gas for collection, from which the foaming gas has been separated by the cooling and liquefying device, though a container filled with an adsorbent and captutring and collecting with the adsorbent the foaming gas remaining in the medium gas for collection,
   wherein the medium gas for collection through the adsorbing device is returned to the cover.

4. The foaming gas separating and collecting system according to claim 2, further comprising an air curtain isolation device for isolating an inside and an outside of the cover from each other by allowing the medium gas for collection or a gas equivalent thereto be expelled to a gap between the cover and at least one of the pair of compression rollers.

5. The foaming gas separating and collecting system according to claim 2, further comprising a fractionating device having a filter Function, in which many openings with a predetermined opening diameter and a predetermined opening ratio are formed, the fractionating device being located on the exit side of the pair of compression rollers and in the cover.

6. The foaming gas separating and collecting system according to claim 5, further comprising a compressing and collecting device for discharging crushed pieces of the foam that have passed through the openirfgs of the fractionating device while compressing the crushed pieces, the compressing and collecting device being located on the exit side of the pair of compression rollers and in the cover.

7. The foaming gas separating and collecting system according to claim 2, wherein the medium gas for collection is an inert gas.

8. The foaming gas separating and collecting system according to claim 2, further comprising a cutting device for cutting and separating in advance a structure comprising a foam into pieces with a size that can be put in the destructive device.

* * * * *